United States Patent

[11] 3,593,798

| [72] | Inventor | Henry C. H. Darley |
| | | Houston, Tex. |
| [21] | Appl. No. | 823,393 |
| [22] | Filed | May 9, 1969 |
| [45] | Patented | July 20, 1971 |
| [73] | Assignee | Shell Oil Company |
| | | New York, N.Y. |

[54] METHOD OF REDUCING THE PERMEABILITY OF A THIEF ZONE
4 Claims, 2 Drawing Figs.

[52] U.S. Cl. .................................................. 166/295,
166/269, 166/276, 166/292
[51] Int. Cl. .................................................. E21b 33/138
[50] Field of Search ........................................ 166/250,
252, 269, 276, 292—295; 175/72

[56] References Cited
UNITED STATES PATENTS

| 3,375,872 | 4/1968 | McLaughlin et al. | 166/292 |
| 2,079,517 | 5/1937 | McQuiston | 166/293 |
| 2,138,713 | 11/1938 | Sullivan | 166/294 |
| 2,302,913 | 11/1942 | Reimers | 166/292 X |
| 2,869,642 | 1/1959 | McKay et al. | 166/250 |
| 2,912,380 | 11/1959 | Groves | 175/72 UX |
| 3,044,547 | 7/1962 | Jarboe | 166/276 |
| 3,107,727 | 10/1963 | Howard | 166/276 X |
| 3,368,623 | 2/1968 | Carter et al. | 166/276 |

*Primary Examiner*—Ian A. Calvert
*Attorneys*—Louis J. Bovasso and J. H. McCarthy ABSTRACT: A method for obtaining a flat injection profile for a fluid, such as a drive fluid used in an oil recovery operation, that is being injected into an interval of earth formation of nonuniform permeability by contacting the most permeable portions of the interval with a slurry containing a mixture of flexible solid fibers and a fiber-bonding agent, such as sodium silicate or a polyepoxide. An agent to precipitate or gel the bonding agent is then injected.

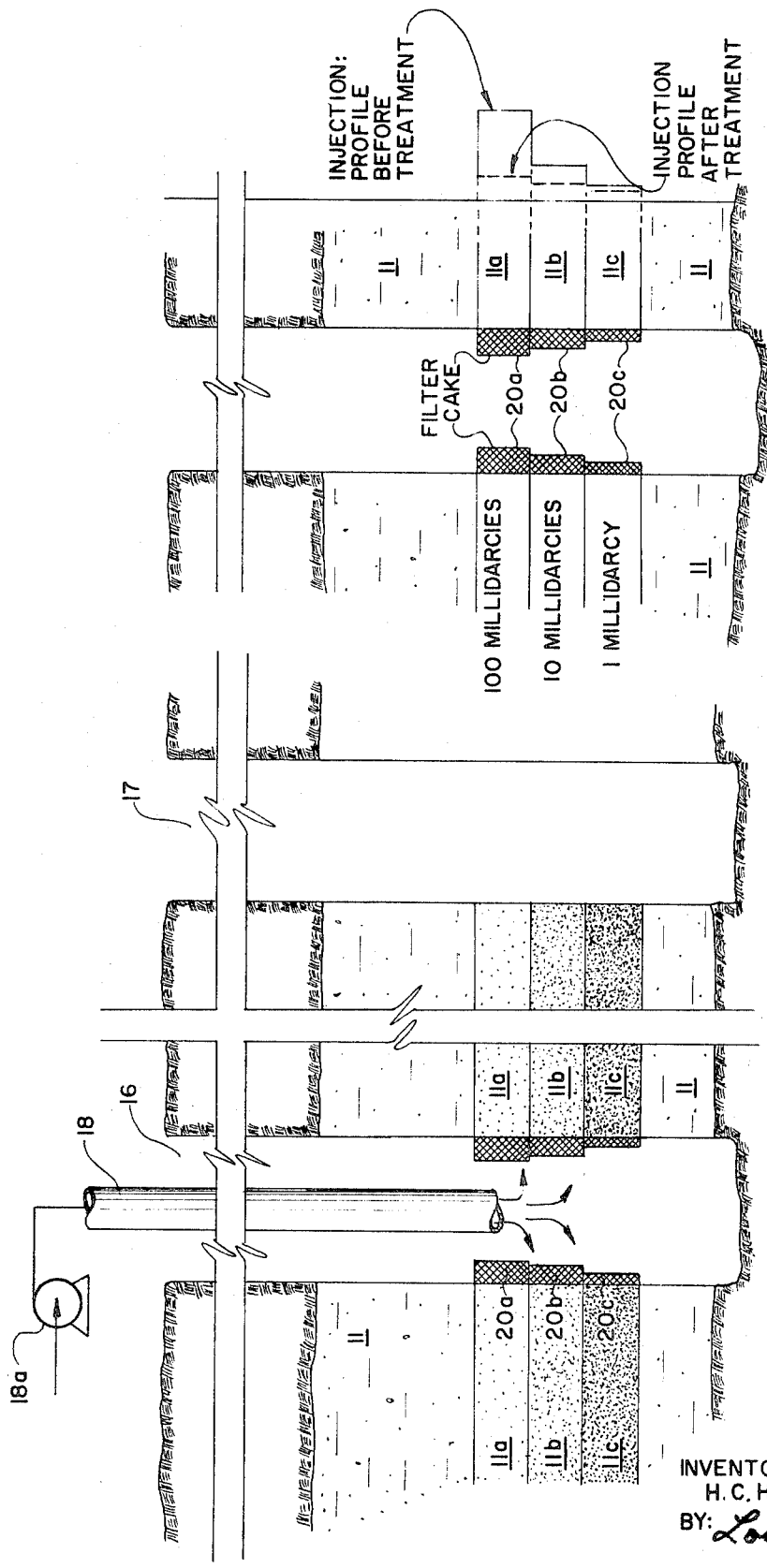

3,593,798

METHOD OF REDUCING THE PERMEABILITY OF A THIEF ZONE

BACKGROUND OF THE INVENTION

Field of the Invention

This invention relates to a method for obtaining a flat injection profile in a fluid injection operation by selectively reducing the permeability of the most permeable layers of an interval of subterranean earth formations that contain layers having different degrees of permeability.

Description of the Prior Art

In a well-treating operation, an aqueous fluid is pumped into at least one injection well and is injected into at least one interval of oil-bearing earth formations in order to displace oil toward at least one production well. It often happens that the interval of the earth formations into which such a fluid is injected is composed of permeable layers having different degrees of permeability. Particularly where some layers are much more permeable than others, the injection profile is irregular. The injected fluid tends to enter and displace oil only within the most permeable layers.

Although numerous chemical and mechanical techniques have been developed to isolate or plug such permeable layers, each has met with limited success. For example, in steam or water injection wells, known techniques have not proved successful in plugging high-permeability zones which are frequently encountered and thus accept essentially all the injected water and produce essentially no oil. The requirements for decreasing injection rates into such permeable zones and obtaining flat injection profiles in waterflood operations call for an inexpensive fluid that can be pumped down a well without resorting to any mechanical placing techniques.

SUMMARY OF THE INVENTION

It is an object of the present invention to provide an improved method for reducing the permeability of high-permeability layers relative to low-permeability layers in formations of nonuniform permeability.

It is a further object of this invention to provide an improved method for economically reducing the permeability of such permeable layers without resorting to significant alteration in the equipment normally present in an injection well borehole or to any mechanical placing techniques.

It is a still further object of this invention to reduce the permeability of such layers by forming a permeability-reducing filter-cake material that is retained in or around a well bore and can readily be removed, for example, to accommodate a change in the well operation such as a change from an injection to a production well, or the like.

It is an even further object of this invention to provide such a method which can be applied at substantially any convenient time prior to, or during, a fluid injection operation.

These and other objects are carried out by treating layers of relatively high-permeability located within an interval of a subterranean earth formation of nonuniform permeability with a slurry containing a mixture of particle flexible fibers and a fiber-bonding material so as to form a compressible porous fibrous mat on the face of the highly permeable layer and thereby reduce the permeability thereof. This treatment can be initiated by first extending well boreholes communicating with the highly permeable layers as mentioned and thereafter treating the desired layers as stated.

BRIEF DESCRIPTION OF THE DRAWING

FIG. 1 is a vertical sectional view of a preferred method of my invention showing a pair of well boreholes extending into communication with a thief zone; and FIG. 2 is a vertical schematic illustration of a portion of an earth formation treated in accordance with the teachings of my invention.

DESCRIPTION OF THE PREFERRED EMBODIMENT

The present invention relates to a process for treating a well to cause the rates as which fluid enters all portions of an interval of earth formations to be substantially equal, i.e., to provide an injection profile that is flat. This is accomplished by contacting all portions of the nonuniformly permeable interval of earth formations with a slurry that contains flexible solid fibers and a fiber-bonding material. The contacting is done at a pressure exceeding the pressure of the fluid in the earth formation so that the suspending liquid flows into the earth formations while fibers and absorbed fiber-bonding material are screened out, in the form of a filter cake, on the face of the earth formations. Since the volume of fluid that flows into an earth formation is greatest in the formation that constitutes the most permeable portion of the interval of earth formations, the thickest layer of filter cake is formed along that portion of the interval. In addition, since the rate at which fluid flows through the filter cake and into an earth formation is highest along the most permeable portions of the interval of earth formations, and since the fibers that form the filter cake are flexible, the extend to which the fibers tend to be deformed and pressed together is the greatest along the most permeable portions of the interval of earth formations. Both of these effects cooperate to enhance the selectivity with which the permeability is reduced along the most permeable portions of the interval of earth formations by more than it is reduced along the less permeable portions of that interval. This tends to produce a flat injection profile.

Referring now to the drawing, FIG. 1 shows a well borehole such as an injection well borehole 16 and a production well borehole 17, extending through a permeable subterranean earth formation 11 into communication with zones or layers 11a through 11c of varying degrees of relatively high permeability. Well boreholes 16 and 17 may be cased, if desired (not shown). A tubing string 18 is preferably disposed in well borehole 16.

A slurry is injected down well borehole 16 and pumped, by means of pump 18a, into layers 11a through 11c in accordance with the teachings of my invention. A mixture of particle-flexible fibers and a fiber-bonding material capable of bonding the fibers together when they are separated out of suspension at the surfaces of layers 11a through 11c are suspended in the fluid. The layers 11a through 11c are of such permeabilities that they are permeable to the fluid but not to the fibers suspended in the fluid. The fluid containing the mixture is maintained in contact with layers 11a through 11c for a period of time sufficient for the mixture to deposit a compressible, porous mat of fibers 20a through 20c on the faces of layers 11a through 11c, respectively. Although only three such layers and fibrous mats are shown in FIG. 1, obviously only one or a plurality of such layers of various permeabilities may be deposed along the extend of well borehole 16.

Communication may be preferably established between well boreholes 16 and 17 by any means known in the art, as for example by circulating fluid from one well borehole to the other. The fiber mixture discussed hereinabove is prepared and the fluid, containing the mixture, is pumped by means of pump 18a down tubing string 18 in well borehole 16 and into layers 11a through 11c. The fluid is displaced into the layers 11a through 11c until a compressible porous mat of fibers 20 is formed The fluid to be injected through the mat 20 and, if desired, fluid displaced by the injected fluid is recovered via borehole 17.

As schematically illustrated in FIG. 2, for example only, layers 11a through 11c may have permeabilities of 100 millidarcies 10 millidarcies, and 1 millidarcy, respectively. The remaining formation 11 is substantially nonpermeable. After deposition of mats 20a through 20c in the form of filter cakes on the faces of layers 11a through 11c, respectively, in accordance with the teachings of my invention, the injection profile of formation 11 before and after treatment shows a relative reduction in the permeability of the most permeable layers 11a through 11c of formation 11.

Thus, the most permeable layers disposed adjacent to a well borehole treated in accordance with the teachings of my invention are rendered less permeable by the deposition of the porous fibrous mats on the faces thereof. In this manner, the uniformity of fluid injection into an interval containing layers having different permeabilities is improved. The varying permeability of the porous compressible mats of fibers flatten the injection profile of the intervals encountered by the well boreholes.

Neither the composition of the slurry fluid, the fibers, or the fiber-bonding material, nor the order of mixing them to form the suspension that is pumped into the well boreholes is particularly critical, provided they are chosen so as to give a filter cake of the required permeability.

Thus the fibers such as asbestos fibers may be commingled with sodium silicate, such as by mixing or impregnating, then suspending in a slug of nonaqueous fluid, with the slug followed by an aqueous liquid containing calcium chloride or an acid adapted to put the sodium silicate in a solid phase, such as by gelling or precipitating the sodium silicate. Alternatively, the fibers may be commingled with a polyepoxide, then suspended in a slug of a poor solvent for polyepoxides, with the slug followed by a curing agent for epoxy resins. Suitable fibers which may be utilized in the foregoing treatments are asbestos, cellulose, polymer, and similar types of fibers. Numerous adhesive materials suitable for bonding the fibers together are known in the prior art. For example, a U.S. Pat. No. 2,823,753 to Henderson et al. discloses a variety of suitable adhesive materials which may be used in carrying out the method of this invention.

The pumping of the slurry fluid containing the mixture, as discussed hereinabove, is generally preceded and followed by measurements of the rate at which the injected fluid is entering the various zones along the interval traversed by the well borehole, schematically illustrated in FIG. 2. Such measurements may involve adding a tracer, such as tritium, to the injected fluid and measuring the rates and proportions at which the tracer is transported through the various layers of the intervening earth formations, as for example to an adjacent well borehole. Suitable techniques for locating and measuring such permeable zones are disclosed in a copending application to Hamby, Ser. No. 693,404, filed Dec. 26, 1967 which matured as U.S. Pat. No. 3,503,447, on Mar. 31, 1970.

The porous mats 20a through 20c formed on the permeable layers 11a through 11c, respectively, in accordance with the teachings of my invention automatically exhibit permeabilities which vary inversely with variations in the permeabilities of the earth formations. Since it is to be understood that the layers have different or varying permeabilities without treatment as discussed hereinabove, different proportions of the well-treating fluids being pumped from one well borehole to another (as, for example, from injection well borehole 16 to production well borehole 17) will be conveyed through the respective layers.

The formation of the porous fibrous mats in accordance with the teachings of my invention results in a single-step process utilizing a unique compressible mat of interbonded flexible fibers. As a slug of a liquid containing particulate flexible fibers mixed with material capable of interbonding the fibers is pumped from a well borehole through the highly permeable zones, the fibers are strained out as the liquid enters the zone and are interbonded into a compressible mat. This mat tends to become thickest and least permeable against the zone into which fluid flow is the greatest. This one step tends to selectively diminish the highest permeability of the permeable subterranean earth formation and forms an injectivity profile that is uniform across all the permeable earth formations into which the well borehole is opened.

EXAMPLE

Slurries of asbestos and Atlas A oil well cement were placed in a lucite cell. A rock plug was used as a filter medium. Six percent NaCl brine was flowed through the cell at a standard pressure of 100 p.s.i. Thus, the initial flow rate depended on the permeability of the rock plug being used as the filter medium. The flow of brine compressed the slurry against the plug of rock at the bottom of the cell, the flow rate declining as the cake was formed. Flow rates were observed for 22 hours, after which the cake was removed and its thickness was measured. The permeability of the cake was calculated from the equation $$\frac{l_1+l_2}{k}=\frac{l_1}{k_1}+\frac{l_2}{k_2}, \text{ where}$$

$l_1$ is the thickness of the rock plug;
$l_2$ is the thickness of the cake;
$k$ is the permeability experimentally observed for the combined plug plus cake for the gross length of the system used;
$k_1$ is the permeability of the plug; and
$k_2$ is the permeability of the cake.

The results, given in table I, show clearly how the high-flow rate through the Berea plugs resulted in cakes which were thinner and of lower permeability than those formed on the Ohio plugs. With the Berea plugs, compaction was complete in about 2 minutes and thereafter the flow rate remained constant. Compaction on the Ohio plugs took about an hour, but the flow rates were only slightly reduced. Although the flow rate later declined about 30 percent, this was unaccompanied by an observable compaction. After the test was completed, it was found that the permeabilities of the Ohio plugs had decreased about 30 percent, so presumably the later decline in flow rates was caused by fines carried from the loose cake into the rock pores. Because of this phenomenon, the cake permeabilities shown in the table were calculated from the flow rates at the end of 2 hours. It should be noted that the permeabilities of the cakes on Ohio plugs are very approximate because they are based on the difference between two nearly equal numbers.

Cakes whose cohesiveness is rated good in the foregoing table had a top layer about 2 mm. thick which was soft enough to be scraped off; the remainder of the cake was pliable but cohesive. About the top third of the cakes which were rated poor had a consistency which differed little from that of the original slurry, and only about the bottom third could be considered cohesive cakes but were harder to break because of the long stringy fibers. Use of a higher proportion of cement with a coarse grade fiber would result in a very strong cake.

From the tests conducted, it would appear that the amount of cement used has little effect on permeability until a certain value is reached and thereafter the permeability decreases sharply.

In a further test, a cake laid down a 5-darcy sandpack with slurry composed of the finest asbestos grade, b 6 percent 7M15, 3 percent cement. The asbestos bridged the pack at once, and subsequent examination showed no penetration of asbestos into the pack.

The tests described hereinabove show how asbestos-cement filter cakes can be used for control of injection rates. Since the injection velocities tested (up to 0.5 ft./min.) were within the range of those prevailing out in oil fields, the experimental data gives some idea of the cake permeabilities and thicknesses to be expected in practice.

TABLE I.—PERMEABILITIES OF COMPRESSIBLE FILTER CAKES BEREA AND OHIO SANDSTONES

Filtration Pressure 100 p.s.i. Throughout

| Expt. No. | Grade of asbestos | Composition, percent by wt. | | | Permeability of rock (md.) | Flow rate | | Permeability of cake (md.) | Thickness of cake (cm.) | Cohesiveness of cake |
|---|---|---|---|---|---|---|---|---|---|---|
| | | Asbestos | Cement | Rock | | Before cake | After 2 hours | | | |
| 1 | 7M15 | 6 | 6 | Ohio | 1.3 | 0.8 | 0.7 | 10 | 3.4 | Poor. |
| 2 | 7M15 | 6 | 6 | Berea | 73 | 55 | 7.1 | 3.9 | 0.9 | Good. |
| 3 | 7M15 | 6 | 6 | do | 113 | 86 | 11 | 3.3 | 0.5 | Do. |
| 4 | 7M05 | 6 | 6 | do | 127 | 90 | 14 | 6 | 0.5 | Do. |
| 5 | 7M05 | 6 | 6 | Ohio | 3.3 | 2.06 | 2.0 | 101 | 2.5 | Poor. |
| 6 | 5D04 | 6 | 6 | do | 3.2 | 2.0 | 1.9 | 48 | 1.7 | Do. |
| 7 | 5D04 | 6 | 6 | Berea | 119 | 83 | 13 | 7 | 0.9 | Fair. |
| 8 | 3T12 | 6 | 6 | do | 1.9 | 83 | 22 | 35 | 2 | Poor. |
| 9 | Plastibest No. 20 | 6 | 6 | do | 113 | 85 | 20 | 9.2 | 0.8 | Fair. |
| 10 | 7M15 | 6 | 3 | do | 111 | 80 | 11 | 3.3 | 0.5 | Good. |
| 11 | 7M15 | 6 | 12 | do | 113 | 86 | 0.007 | 0.003 | 1.05 | Hard cement. |

I claim:

1. A method of rendering nonuniform permeable layers of a subterranean earth formation essentially uniformly permeable layers comprising the steps of:

extending at least one well borehole into communication with said formation layers;

commingling and mixing flexible solid fibers with a fiber bonding material selected from the group consisting of sodium silicates and a polyepoxide;

injecting by pumping into the more permeable layers of the formation via the well borehole said mixture as a suspension in a nonaqueous fluid;

injecting an aqueous liquid composition containing a substance adapted to precipitate or gel the bonding material as a solid phase; and continuing pumping said fluid and aqueous liquid composition for a period of time sufficient for the mixture to deposit a compressible porous mat of fibers on the face of the highly permeable layers of the formation.

2. The method of claim 1 wherein the bonding material is sodium silicate and the step of following the suspension by an aqueous liquid containing a substance adapted to put the sodium silicate in a solid phase includes the step of following the suspension by an injection of an aqueous liquid containing calcium chloride.

3. The method of claim 1 wherein said mixture is a mixture of fibers and polyepoxide in a slug of a nonaqueous fluid which is a solvent in which polyepoxides are partially miscible; and said substance is a curing agent for epoxy resins.

4. A method for treating layers of relatively high permeability located within an interval of a subterranean earth formation of nonuniform permeability, comprising the steps of:

making up a slurry of a nonaqueous fluid containing a mixture of particulate asbestos fibers and sodium silicate;

injecting and pumping into said highly permeable layers the fluid containing the mixture of particulate asbestos fibers and sodium silicate;

injecting and pumping into said layers an aqueous fluid containing a solidifying agent selected from the group consisting of $CaCl_2$ and an acid; and continuing said pumping of said fluids until a compressible porous mat forms on the face of said layers, thereby reducing the permeability of said layers.